US006934445B1

(12) United States Patent
Leaird et al.

(10) Patent No.: US 6,934,445 B1
(45) Date of Patent: Aug. 23, 2005

(54) DIRECT SPACE-TO-TIME PULSE SHAPER AND OPTICAL WORD GENERATOR

(75) Inventors: Daniel E. Leaird, West Lafayette, IN (US); Andrew M. Weiner, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 10/856,487

(22) Filed: May 28, 2004

Related U.S. Application Data

(60) Provisional application No. 60/474,023, filed on May 29, 2003.

(51) Int. Cl.$^7$ .............................. G02B 6/34; H04J 14/00
(52) U.S. Cl. ............................... 385/37; 385/1; 385/2; 385/14; 385/129; 385/24; 398/53; 398/55; 398/84; 398/182; 398/191
(58) Field of Search ............................. 385/37, 14, 24, 385/15, 1, 2, 3, 129, 130, 131, 42; 398/52, 53, 55, 57, 82, 84, 140, 141, 182, 183, 191, 200

(56) References Cited

U.S. PATENT DOCUMENTS

| | | | | |
|---|---|---|---|---|
| 5,239,598 A | * | 8/1993 | Wight et al. | 385/8 |
| 6,122,419 A | * | 9/2000 | Kurokawa et al. | 385/31 |
| 6,456,760 B1 | * | 9/2002 | Kurokawa et al. | 385/31 |
| 6,577,782 B1 | * | 6/2003 | Leaird et al. | 385/15 |
| 2003/0095737 A1 | * | 5/2003 | Welch et al. | 385/14 |
| 2003/0128917 A1 | * | 7/2003 | Turpin et al. | 385/24 |

OTHER PUBLICATIONS

R. Adar, C.H. Henry, C. Dragone, R.C. Kistler, M.A. Milbrodt, "Broad–band array multiplexers made with silica wave–guides on silicon," *J. Lightwave Tech.*, vol. 11, 212–219, (1993).

K. Okamoto, "Arrayed–Waveguide Grating Multiplexer with Flat Spectral Response," *Opt. Lett.*, vol. 20, 43–45 (1995).

(Continued)

*Primary Examiner*—Brian M. Healy
(74) *Attorney, Agent, or Firm*—William F. Bahret

(57) ABSTRACT

An optical communications subsystem is proposed to permit the multiplexing of multiple, parallel electronic data streams onto a serial, very high speed optical data channel. The subsystem may also be used to generate programmable ultrafast optical data words for the testing of optical components, and system performance testing of very high speed data transmission systems. The key device component, based on a modified arrayed waveguide grating structure, is directly integratable with a high-speed optoelectronic modulator array in a simple, cost effect, and manufacturable configuration. Pulse spacings as small as 1 picosecond have been demonstrated corresponding to an effective data rate of up to one terahertz. An integrated optical pulse generator is configured to receive a laser light input and output an optical pulse train. Direct space-to-time pulse shaping and optical pulse train generation is achieved by use of an arrayed waveguide (AWG) that is double-passed. A mask is utilized for time domain pulse shaping that is employed after a single pass through the arrayed waveguide. In the case of an optical data/word generator, a spatially patterned mask translates spatial data, for example representing binary data or a binary word, of the mask to the output optical pulse train. The arrayed waveguide (AWG) system has waveguide ports that double as inputs and outputs, and provides direct space-to-time pulse shaping of a single, short pulse laser/optic signal. Direct optical access to individual guides in the waveguide array allows one to control the light intensity in each guide and therefore control the output pulse intensities with a one-guide one-pulse effect.

26 Claims, 5 Drawing Sheets

OTHER PUBLICATIONS

K. Okamoto, and A. Sugita, "Flat spectral response arrayed–waveguide grating multiplexer with parabolic waveguide horns," *Elect. Lett.*, vol. 32, 1661–1662 (1996).

I.Y. Khrushchev, J.D. Bainbridge, J.E.A. Whiteaway, I.H. White, and R.V. Petty, "Multiwavelength pulse source for OTDM/WDM applications based on arrayed waveguide grating," *IEEE Photon. Tech. Lett.*, vol. 11, 1659–1661 (1999).

K. Okamoto, "Recent progress of integrated optics planar lightwave circuits," *Opt. and Quant. Elec.* vol. 31, 107–129 (1999).

D.E. Leaird, S. Shen, A.M. Weiner, A. Sugita, S. Kamei, M. Ishii, and K. Okamoto, "1 THz Repetition Rate WDM Pulse Train Generation from an Arrayed–Waveguide Grating," *Conference on Lasers and Electro–Optics Postdeadline Papers*, CPD18 (2000).

D.E. Leaird, A.M. Weiner, S. Shen, A. Sugita, S. Kamei, M. Ishii, and K. Okamoto, "Generation of High Repetition Rate WDM Pulse Trains from an Arrayed–Waveguide Grating" *IEEE Photonics Technology Letters*, vol. 13, Mar. 2001, pp. 221–223.

D.E. Leaird, and A.M. Weiner, "Femtosecond direct space-to-time pulse shaping," *IEEE Journal of Quantum Electronics*, vol. 37, Apr. 2001, pp. 494–504.

D.E. Leaird, S. Shen, A.M. Weiner, A. Sugita, S. Kamei, M. Ishii, and K. Okamoto, "High Repetition Rate Femtosecond WDM Pulse Generation using Direct Space–to–Time Pulse Shapers and Arrayed Waveguide Gratings," *Optical & Quantum. Electronics*, vol. 33, Jul. 2001, pp. 811–826.

D.E. Leaird, S. Shen, A.M. Weiner, A. Sugita, S. Kamei, M. Ishii, and K. Okamoto, "High Repetition Rate Flat–Topped Pulse Trains from an Arrayed Waveguide Grating," *OSA Trends in Optics and Photonics (TOPS) vol. 56, Conference on Lasers and Electro–Optics (CLEO 2001)*, Technical Digest (Optical Society of America, Washington, DC, 2001), pp. 187–188.

D.E. Leaird, S. Shen, A.M. Weiner, A. Sugita, S. Kamei, M. Ishii, and K. Okamoto, "1 THz Repetition Rate Multichannel Pulse Train Source using an Arrayed Waveguide Grating," *OSA Trends in Optics and Photonics (TOPS) vol. 54, Optical Fiber Communication Conference*, Technical Digest (Optical Society of America, Washington, DC, 2001), pp. WP1–1–WPI–3.

D.E. Leaird, S. Shen, A.M. Weiner, A. Sugita, H. Yamada, S. Kamei, M. Ishii, and K. Okamoto, "Direct space–to–time pulse shaper/arrayed waveguide grating analogy for high repetition rate WDM pulse train generation," in *Ultrafast Optics and Optoelectronics*, OSA Technical Digest (Optical Society of America, Washington DC, 2001), pp. 6–8.

D.E. Leaird, A.M. Weiner, S. Kamei, M. Ishii, A. Sugita, and K. Okamoto, "Generation of Flat–Topped 500 GHz Pulse Bursts Using Loss Engineered Arrayed Waveguide Gratings," *IEEE Photonics Technology Letters*, vol. 14, Jun. 2002, pp. 816–818.

D.E. Leaird, A.M. Weiner, S. Kamei, M. Ishii, A. Sugita, and K. Okamoto, "Double–Passed Arrayed Waveguide Grating for 500 GHz Pulse Burst Generation," *IEEE Photonics Technology Letters*, vol. 14, Oct. 2002, pp. 1451–1453.

* cited by examiner

DIRECT SPACE-TO-TIME PULSE SHAPER AND OPTICAL WORD GENERATOR

CROSS-REFERENCE TO RELATED APPLICATION

This application claims the benefit of U.S. Provisional Patent Application No. 60/474,023, filed May 29, 2003, which application is hereby incorporated by reference along with all references cited therein.

BACKGROUND OF THE INVENTION

This invention relates to optical communication systems and, more particularly, to an apparatus and method for creating high repetition pulse trains and/or optically transmitting data in optical data telecommunications systems and generating data-modulated optical pulse trains (e.g. optical words) for use in such systems.

In view of increasing optical communication network demands, significant efforts are being expended in the development of high repetition rate pulse optical clock sources or optical clocks. Such optical clocks are a critical component in current and future optical networks. One attractive methodology is repetition rate multiplication of a lower rate source to generate very high repetition rate pulse bursts and/or trains. This methodology may use a modified arrayed waveguide grating (AWG). The arrayed waveguide grating, frequently used in optical communication systems as channel multiplexers/demultiplexers, has seen limited prior use in time-domain applications.

Such a standard AWG device is depicted in FIG. 1. Particularly, FIG. 1 shows a schematic diagram of an exemplary standard AWG 20 generally fabricated from planar glass layers (e.g. films of silica glass) deposited on a silicon, or other suitable substrate and processed using microelectronic fabrication techniques inherited from the silicon VLSI (Very Large Scale Integration) industry. AWG 20 consists of one or more input guides (Input(s)) represented by single input guide 22. Input guide 22 is connected to input slab waveguide 24.

AWG 20 also includes waveguide array 26 consisting of a plurality of waveguides having a constant length difference between adjacent guides in the array. Moreover, AWG 20 further includes output slab waveguide 28, and a series of output guides (Outputs) 30. In operation, light from input guide 22 is transferred to one of the output guides 30 depending on its wavelength due to the spectrometer structure of waveguide array 26 and output slab waveguide 28 which function as a grating/lens combination.

In prior time-domain applications, an AWG has been used to spectrally slice supercontinuum sources in order to generate pulse trains on multiple output channels. Alternatively, using a mode-locked source laser with the AWG permits the generation of trains of tens of picosecond pulses at the repetition rate of the source laser. An AWG excited by a single lower repetition rate laser generating high repetition rate burst or short pulses, or in principle a continuous train, as multiple, spatially separated output wavelengths, has also been shown to be analogous to a direct space-to-time (DST) pulse shaper previously demonstrated in bulk optics.

A methodology has been demonstrated by the present inventors for modifying the conventional AWG structure as presented in FIG. 2, and incorporating a short pulse laser source to excite the AWG in order to generate very high repetition rate pulse bursts. This modification may be considered a "PulseAWG". A key design constraint of the PulseAWG is that the delay increment between adjacent guides in the waveguide array must be greater than the pulse width of the input pulse. In this case, the pulses from each guide of the waveguide array are temporally separated (spatial domain) and a pulse burst is generated with a pulse-to-pulse spacing (time domain) equal to the waveguide array delay increment. This design constraint arrangement may be termed a one-guide, one pulse methodology.

FIG. 2 presents a schematic representation 40 of the one-guide, one pulse methodology utilizing an AWG 42. An optical pulse or signal 44 is provided at input guide 46 of an input slab waveguide 48. A spatial profile of waveguide excitation 50 is provided to a waveguide array 52 wherein individual optical pulses 44 are excited. Wavelengths are separated at the output slab 60, wherein all the phases from each guide in the array are aligned so that the waveguide array acts like a combined grating/lens. This is represented by the temporal profile 54. The output slab region is essentially like the propagation region behind a bulk lens (i.e. an input collimated beam focuses a focal length away from the lens). An output pulse train 56 is thus provided on output guide 58 of output waveguide slab 60.

A further modification of the conventional AWG structure permits arbitrary pulse sequence generation. These arrangements yield multiple spatially separated output channels with identical temporal intensity profiles but varying center wavelength similar to operation of a bulk optic based apparatus that is known as a direct space-to-time (DST) pulse shaper. The DSTAWG pulse shaper has significant potential to impact the optical communications industry by integrating and simplifying the data transmission portions of ultrafast optical word generator systems or subsystem, i.e. for combining output data words from fast electrical interfaces and serializing them for transfer over an ultrafast optical channel. This parallel electrical to serial optical data stream conversion operation is a key bottleneck in high speed photonic (optic) networks. Thus, there is an ongoing need for further improvements in optical data telecommunications, particularly with respect to parallel electrical to serial optical data stream conversion. The current embodiments of DSTAWGs, however, are not necessarily optimum configurations.

It is therefore desirable to have a more efficient manner of producing ultrafast optical pulses particularly, but not exclusively, for use in optical communication systems.

It is therefore also desirable to have a more efficient manner of producing ultrafast optical data and/or words particularly, but not necessarily, for use in optical communication systems.

It is therefore further desirable to have a method and/or apparatus for producing ultrafast optical pulses.

It is therefore even further desirable to have a method and/or apparatus for producing ultrafast optical data and/or words.

It is therefore still further desirable to have a method and/or apparatus for converting a parallel electrical binary data word into a serial optical binary data word particularly, but not exclusively, for use in optical communication systems.

It is therefore even further desirable to have a method and/or apparatus for direct space-to-time mapping between a spatial pattern and a resultant ultrafast optical waveform for use in high-bit-rate data telecommunications wherein the spatial pattern represents data and/or word.

These and other features and advantages of the present invention will be presented in more detail in the following specification of the invention and in the associated figures.

SUMMARY OF THE INVENTION

An optical communications subsystem is proposed to permit the multiplexing of multiple, parallel electronic data streams onto a serial, very high speed optical data channel. The subsystem may also be used to generate programmable ultrafast optical data words for the testing of optical components, and system performance testing of very high speed data transmission systems. The key device component, based on a modified arrayed waveguide grating structure, is directly integratable with a high-speed optoelectronic modulator array in a simple, cost effect, and manufacturable configuration. Pulse spacings as small as 1 picosecond have been demonstrated corresponding to an effective data rate of up to one terahertz. An integrated optical pulse generator is configured to receive a laser light input and output an optical pulse train. Direct space-to-time pulse shaping and optical pulse train generation is achieved by use of a modified arrayed waveguide (AWG) that is double-passed. A mask is utilized for time domain pulse shaping that is employed after a single pass through the arrayed waveguide. In the case of an optical data/word generator, a spatially patterned mask translates spatial data, representing a parallel data stream for example a binary word, of the mask to the output optical pulse train. The arrayed waveguide (AWG) system has waveguide ports that double as inputs and outputs. Direct optical access to individual guides in the waveguide array allows one to control the light intensity in each guide and therefore control the output pulse intensities with a "one-guide one-pulse" effect.

In one form, there is provided a direct space-to-time integrated-optic arrayed waveguide grating. The direct space-to-time integrated-optic arrayed waveguide grating having a plurality of fibers defining combined input/outputs each one of which is adapted to receive a short pulse laser input, a slab waveguide collecting the plurality of combined input/outputs, a plurality of waveguides, and a spatial mask positioned at a reflection point of the plurality of waveguides and operable to selectively reflect light beam pulses back through the waveguides according to the spatial mask and out one of the combined input/outputs.

In another form, there is provided an optical transmitter. The optical transmitter includes a direct space-to-time pulse shaper comprising an integrated optic waveguide array defining a first end having a slab waveguide with a plurality of ports and an opposing end, and a mask positioned at the opposing end of the waveguide array. At least one of the plurality of ports functioning as an input for receiving a laser input source of a first pulse rate and an output for providing an optical pulse train of a second pulse rate with the optical pulse train patterned by the mask.

In yet another form, there is provided a method for generating an optical transmission. The method includes the steps of: (a) providing a direct space-to-time pulse shaper comprising an integrated optic waveguide array defining a first end having a slab waveguide with a plurality of ports and an opposing end, and a mask positioned at the opposing end of the waveguide array, each one of the plurality of ports functioning as an input for receiving a laser input source of a first plate rate and an output for providing an optical pulse train of a second pulse rate, the optical pulse train and as patterned by the mask; and (b) providing a short pulse laser source as input to at least one of the plurality of ports.

The objects and advantages of the present invention will be more apparent upon reading the following detailed description in conjunction with the accompanying drawings.

BRIEF DESCRIPTION OF THE DRAWINGS

Like reference numerals indicate the same or similar parts throughout the several views.

DETAILED DESCRIPTION OF PREFERRED EMBODIMENTS

Figure 1:
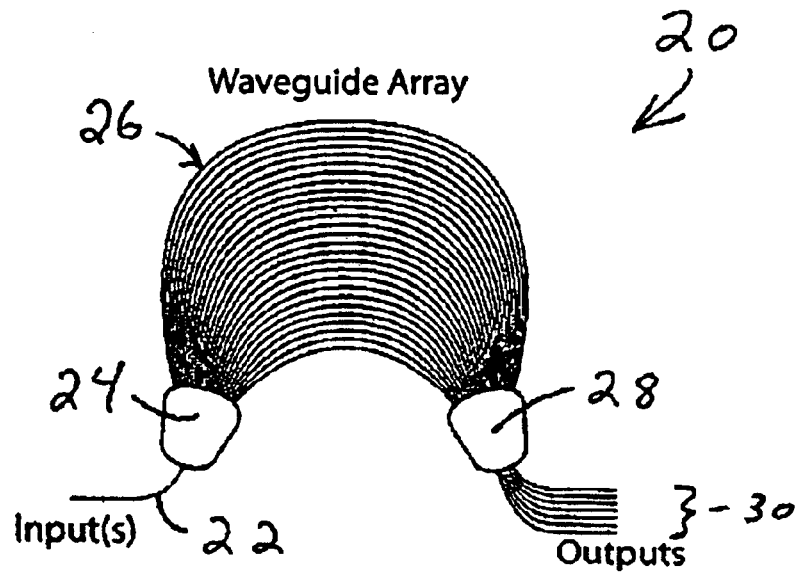
FIG. 1 is a schematic diagram of an integrated-optic arrayed waveguide grating (AWG).
Figure 2:
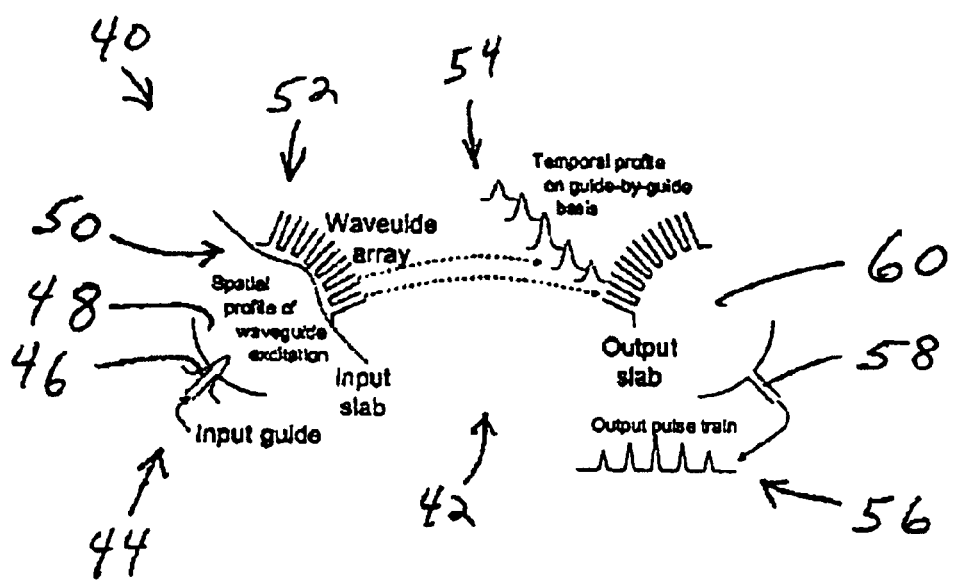
FIG. 2 is a schematic diagram of a one-guide one-pulse design methodology for the AWG of FIG. 1.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 3:
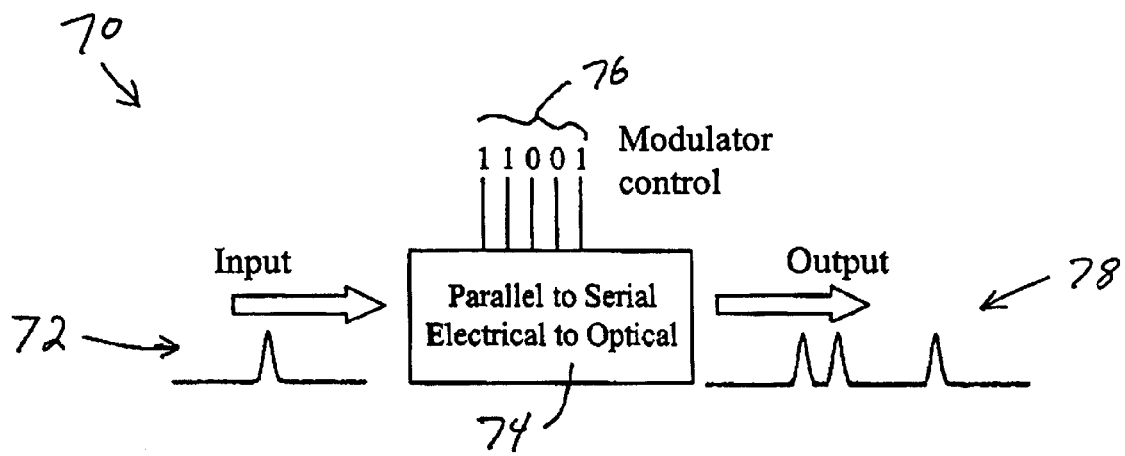
FIG. 3 is a schematic diagram of a parallel electrical to serial optical word generator of the type in which the present invention may be used.

A schematic representation of an ultrafast optical word generator functionality 70 is represented in FIG. 3. In this case, short optical pulses (input signal or input pulses) 72 from a pulsed optical source (e.g. a modelocked laser) are manipulated via a parallel to serial, electrical to optical converter 74 to form a high speed pulse train optical word packet (output pulse train) 78. The parallel to serial, electrical to optical converter 74 may consist of an optoelectronic modulator array and a direct space-to-time (DST) pulse shaper. The DST pulse shaper may be configured in bulk optics or integrated optics (such as a DSTAWG). A data word 76 is input as electrical signals representing the appropriate data levels as a modulator control. The data word 76 is output in time domain pulse train form 78. One implementation would utilize binary "0" and "1" data levels in the electrical domain as modulator control and the output time domain signal would consist of temporally separated pulses of light corresponding to each "1" and a removal of pulses for each "0".

Figure 4:
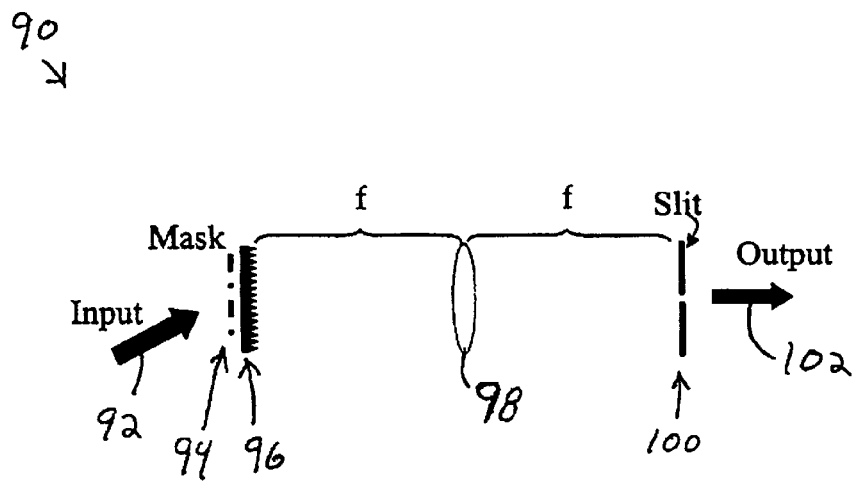
FIG. 4 is a schematic diagram of a bulk optic direct space-to-time pulse shaper.

An implementation of a parallel to serial, space-to-time converter 90 is presented in FIG. 4 in bulk optics. The converter 90 receives an input optic pulse or pulse train (pulses) 92 at a spatially patterned mask 94. The spatial pattern of the mask 94 encodes or represents data/word. The mask 94 is present at a diffraction grating 96. A pulse shaping lens 98 collects and focuses the spatially dispersed frequency components (wavelengths) of the input beam 92 that are diffracted from the grating 96. The lens 96 is placed at a focal length f of the lens 98, while an output slit 100 is placed at another focal length f away from the lens 98 (i.e. the thin slit 100 is at the Fourier plane of the pulse shaping lens 98). The output slit 100 samples the spatially dispersed frequency components of the input beam 92. For a sufficiently thin slit, the output field is given by the input pulse convolved with a scaled representation of the spatial profile at the grating (i.e. the thin slit 100 filters the dispersed spectrum, and in the ideal case generates a spatially homogenous output beam whose temporal-intensity profile is given by a scaled replica of the spatial masking function (pattern) present at the diffraction grating).

The bulk optic configuration 90 is a spectrometer arrangement with the addition of a spatially patterned mask on top of the diffraction grating. A short discussion of the spectrometer analogy illuminates the operation of the DST pulse shaper in the case of a simple mask. If a spectrometer (without a spatially patterned mask) is configured for maximum spectral resolution (large beam on the diffraction grating and a thin output slit), the output consists of a narrow spectral feature. If the input consists of a short temporal duration optical pulse, then the output pulse, in time, is broadened with respect to the input due to the spectral filtering performed by the spectrometer. If the apparatus configuration is unperturbed except that the size of the input beam is decreased, the resolution of the spectrometer is decreased as well. If one considers the input to be a short optical pulse again, then the output spectrum is broadened with respect to the previous case. The width of a mask, which modifies the spatial extent of the beam on the diffraction grating, can then be seen to modify the temporal duration of the apparatus output directly.

Figure 5:
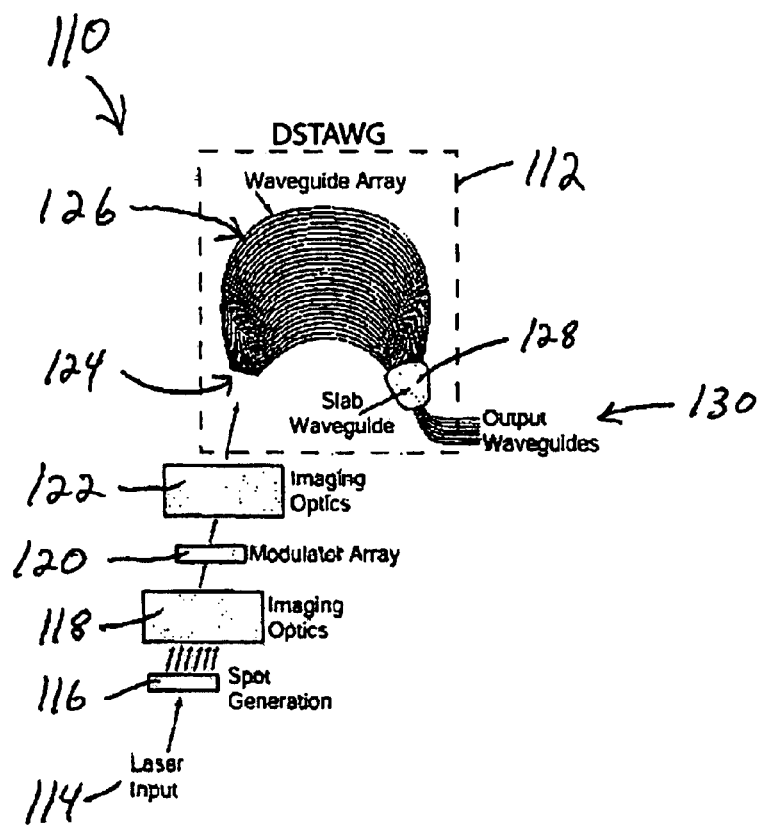
FIG. 5 is a schematic diagram of one form of an integrated optic direct space-to-time arrayed waveguide grating pulse shaper.

In an integrated optic device such as the AWG 20 of FIG. 1, an example implementation was considered to consist of the following as illustrated in FIG. 5. FIG. 5 depicts an optical transmitter or optical data/word generator 110. A high repetition rate (for example at a repetition rate of 10 GHz) laser input 114 producing short pulses at ~1550 nm, is passed through spot generation 116 and imaging optics 118 before passing through a modulator array 120 (e.g. an optoelectronic modulator array of N elements each capable of operating at the same rate as the source, laser). The output of the modulator array 120 is passed through imaging optics 122 before passing into multiple inputs 124 of a DSTAWG (Direct Space-to-Time Arrayed Waveguide Grating) 112 pulse shaper. The DSTAWG 112 has N delay channels (waveguides) 126 and tau delay spacing from one waveguide (of the waveguides 126) to the next. The optical path is from the source laser 114, to a mask 120, to spectral disperser at the DST pulse shaper 112 input 124. The DSTAWG 112 combines the optical pulses from the various waveguides 126 at an output slab waveguide 128. A plurality of outputs 130 emanate from the output slab waveguide 128, each one of which outputs the spatial data from the mask 120 as serial optical data.

A key issue with this type of optical transmission system is the optoelectronic modulator array 120 and its alignment to the DST pulse shaper 112. Either the modulator array is required to be used in transmission mode, which is not how currently envisioned optoelectronic modulator arrays are utilized, or a complex optical system is required to image the input beam onto the modulator array 120 and then image the modulator array to the DST pulse shaper 112 input 124. This cascade imaging operation is both technically difficult to implement, and potentially expensive for production. Further, the cascaded imaging system 110 requires precise optical alignment. It is especially challenging to couple the light effectively into a whole array of waveguides given the required strongly elliptical input beam dimensions. The implementation of FIG. 6 solves at least some of these problems since it is less expensive to manufacture, easy to align, can be packaged robustly, is more compact, and will have less optical loss.

Figure 6:
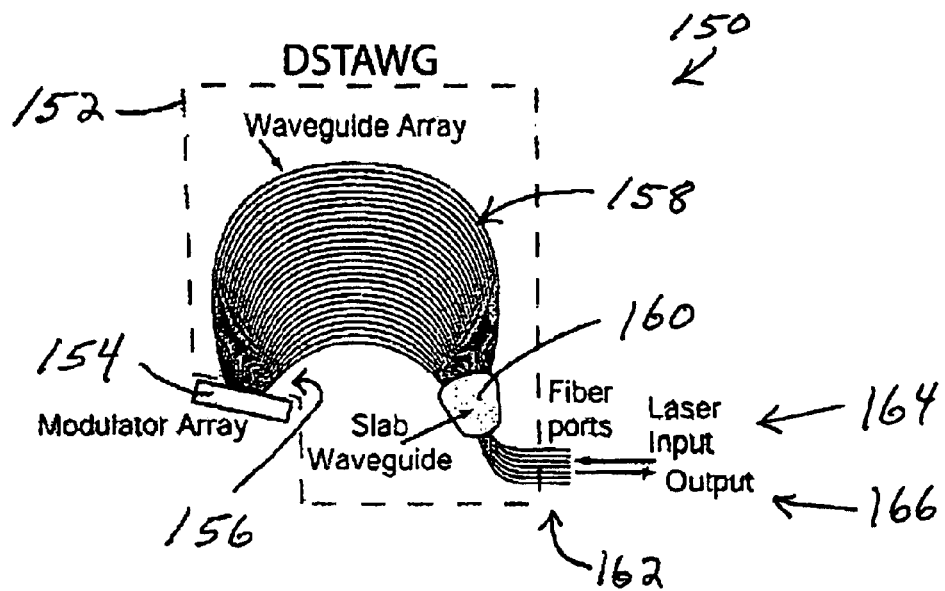
FIG. 6 is a schematic diagram of an integrated optic direct space-to-time arrayed waveguide grating (DSTAWG) pulse shaper in accordance with the principles of the present invention.

FIG. 6 shows a preferred or best mode embodiment or implementation in accordance with the principles of the subject invention within an optic transmitter, optical pulse generator, optic pulse shaper, direct space-to-time arrayed waveguide grating (DSTAWG) or integrated optic DSTAWG pulse shaper 150 (collectively, DSTAWG pulse shaper 150). The DSTAWG pulse shaper 150 includes an integrated-optic arrayed waveguide grating (AWG) structure 152 consisting of a waveguide array 158 of a plurality of individual waveguides or guides, a slab waveguide 160, and a plurality of ports 162. Each one of the plurality of fiber ports 162 is an input for a laser source input 164 and an output for an output pulse train 166. Generally, only one fiber port is used as the input, while each other fiber port may be used as an output (i.e. each fiber port provides an identical time-domain pulse train signal in response to the input signal with the output center wavelength shifting from one output to the next). The slab waveguide 160 is operable to divide the incoming optical signal into optical components that travel along individual waveguides of the waveguide array 158. A modulator array (mask) 154 is positioned at an end 156 of the waveguide array 158 that is opposite or opposing the input end (port end). Particularly, the reflection modulator array (mask) 154 is coupled directly to the waveguide array 158. Preferably, but not necessarily, the reflection modulator array 154 consists of a high-speed optoelectronic array, although it could consist of a fixed reflection mask (for fixed word generator applications), or a more slowly varying programmable mask (e.g. liquid crystal) for relatively slow but programmable word generator applications. Further, the modulator array can function in amplitude only, phase only or combined amplitude/phase mode.

The slab waveguide 160 also recombines the light pulses reflected from the mask 154 such that each fiber port serves as an output. While the input port may be used as an output with the connection of a circulator (not shown), it is generally not. The optical path for the DSTAWG pulse shaper 150 goes from the short pulse source laser input 164 to one of the fiber ports 162, through the waveguide array 158, reflects off the mask 154 according to the pattern of the mask, back through the waveguide array 158, combined in the slab waveguide 160 and output on each one of the plurality of ports 162. In this manner, the DSTAWG 150 is used backward compared to that shown in FIG. 5 and in a double-passed mode. Without comparison to that shown in FIG. 5, the DSTAWG 150 is double-passed (i.e. the optic signals are twice passed through the arrayed waveguide grating 152 or once in one direction and then in another direction through reflection).

It should be appreciated that the integrated AWG may be fashioned in bulk optics. Moreover, the imaging operation provided by the present invention may be accomplished by imaging out of the waveguide array onto a reflective modulator array or through a transmission modulator array and then back into the DSTAWG device.

Figure 7:
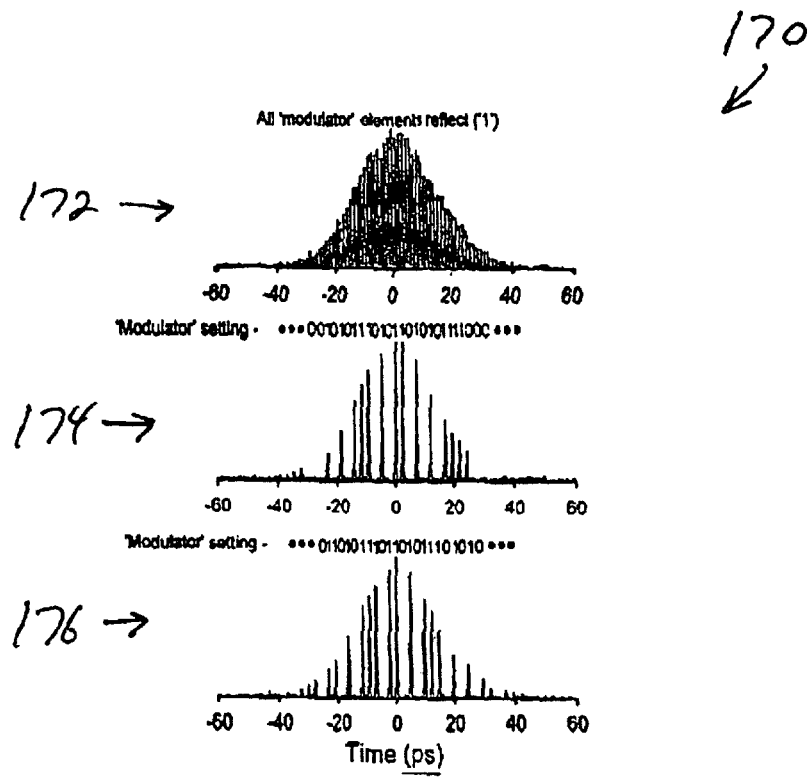
FIG. 7 is a chart of various graphs depicting measured intensity cross correlation data for several different reflection masks (modulator settings) for the present DSTAWG.

FIG. 7 shows a data chart 170 of a first demonstration of the double-passed DSTAWG implementation 150. This data was obtained using an erbium fiber laser capable of producing ~100 fs (femtosecond) pulses at a center wavelength of 1570 nm (nanometers) and a 50 MHz repetition rate. The output of the fiber laser was split into signal (to pulse shaper) and reference (unshaped) paths, and all fiber links were constructed to be dispersion compensated with an appropriate combination of dispersion compensating fiber and single mode fiber. The output temporal intensity profile of the implementation 150 was recorded via intensity cross correlation. For this prototype demonstration, the high-speed optoelectronic modulator array was replaced with a simple reflective mask that can be manually changed to simulate modulating individual pixels of the array. Amplitude only modulation is demonstrated here; although, phase control could be performed as well. Generation of optical high speed data packets with a direct correspondence between individual modulator elements and temporal features is clearly demonstrated.

Particularly, chart 170 of FIG. 7 presents measured cross correlation data for several different reflection masks. Graph 172 depicts the pulses in time (ps) when all of the modulator elements of the reflection mask are set to reflect (indicating or representing a binary "1" condition or state, thus non-reflection representing a binary "0" condition or state). Graph 174 depicts the pulses in time (ps) when the modulator setting is "001010111010110101011111000". Graph 176 depicts the pulses in time (ps) when the modulator setting is "011001011101101011101010". For simplicity, only binary data patterns have been demonstrated; it should be clear from this demonstration that other multi-level coding schemes could be employed as well.

Figure 8:
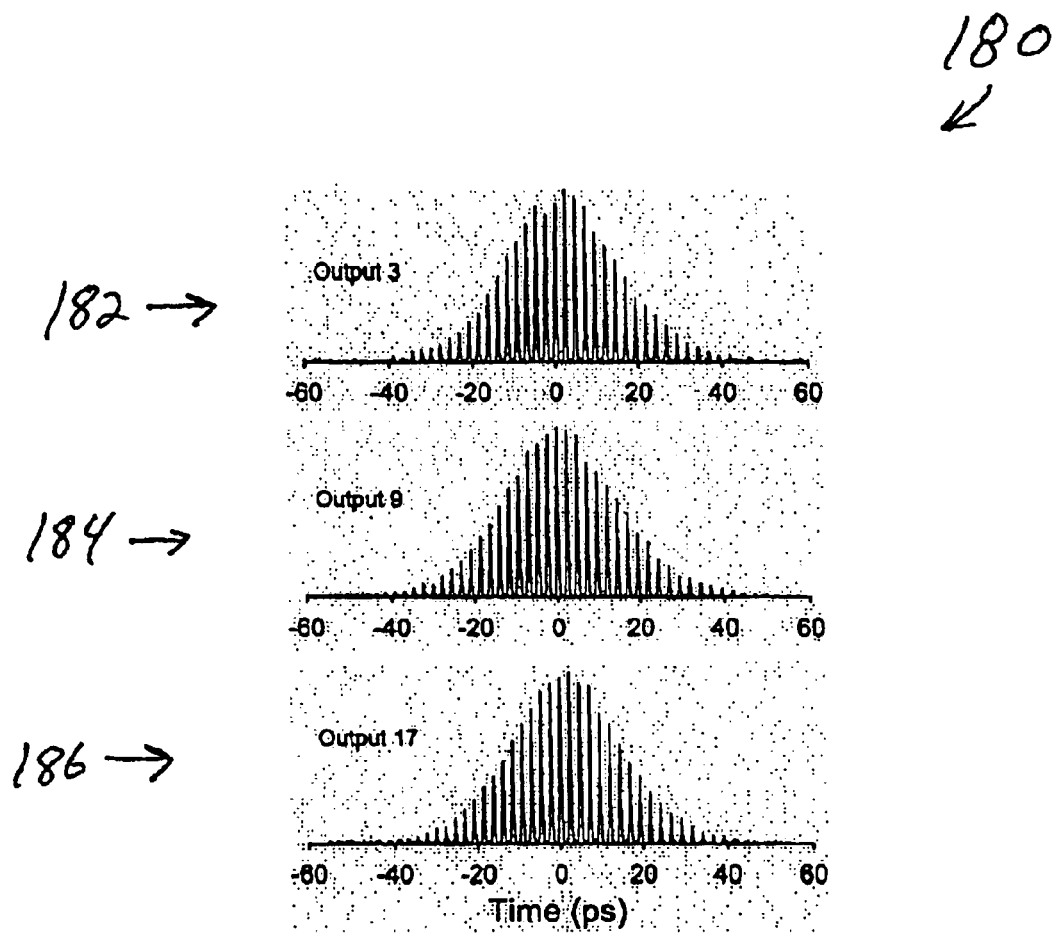
FIG. 8 is a chart of various graphs depicting output temporal profiles measured by intensity cross correlation for three different output fiber ports of the present DSTAWG.

Chart 180 of FIG. 8 presents graphical data regarding the ability for the present invention to demonstrate multiple output channels (fiber ports) with the same temporal intensity profile. Particularly, chart 180 presents three graphs 182, 184, 186 of three fiber ports 162 outputs (output temporal profiles measured by intensity cross correlation for three different output fiber ports) of the implementation 150 of FIG. 6. Graph 182 is pulse output in time (ps) arbitrarily from output "3" (fiber port "3"). Graph 184 is pulse output in time (ps) arbitrarily from output "9" (fiber port "9"). Graph 186 is pulse output in time (ps) arbitrarily from output "17" (fiber port "17"). Input was received on fiber port "10".

Figure 9:
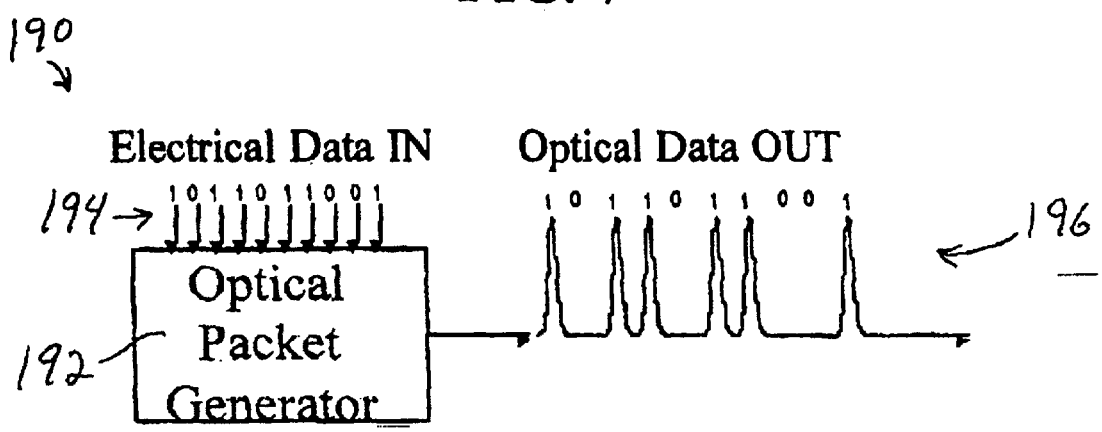
FIG. 9 is schematic diagram of an exemplary optical word generator illustrating the conversion of a parallel, electrical word to a serial optical word.

FIG. 9 depicts a schematic diagram of a conversion device 190. Particularly, the conversion device 190 converts a parallel electrical word (here the binary word "1011011001") into a serial optic word (pulses or pulse train). The conversion device 190 includes an optical packet generator 192 that utilizes the present DSTAWG device 150. Electrical data 194 is input into the optical packet generator in a parallel fashion and output as optical data 196 (i.e. as a pulse train wherein a pulse equates to a binary "1" and no pulse equates to a binary "0").

It should be appreciated that other coding techniques other than binary may be used in forming and transmitting data and/or words. Binary is used as an example since it is widely used in digital communications.

In all cases, the amplitude of the pulses when the AWG is not loss or excitation engineered follows a Gaussian distribution as easily discerned from the graphs. Loss engineering may be introduced to the AWG 152 (waveguides 158) to provide pulses with the same or near same amplitude. Particularly, additional enhancement of the DSTAWG 150 is to employ loss-engineering and/or excitation-engineering to control the relative excitation amplitude of each guide in the waveguide array. Loss-engineering entails inserting additional loss into the center guides of the waveguide array and, perhaps, eliminating some outer guides so that all waveguide array elements have the same optical power. Excitation engineering entails controlling the relative excitation amplitude without experiencing additional loss.

One implementation of excitation engineering is to use waveguide funnels with wider funnels at the outer guides in the waveguide array. These design controls are utilized so that each pulse in the output pulse train has the same amplitude rather than falling under a Gaussian temporal window as is the case when these design controls are not employed. Various strategies for providing design controls may be found in the following publications:

D. E. Leaird and A. M. Weiner, *Direct Space-to-Time Pulse Shaper and Optical Pulse Train Generator*, U.S. Pat. No. 6,577,782.

D. E. Leaird and A. M. Weiner, "High Repetition Rate Femtosecond Direct Space-to-Time Pulse Shaping Using a Modified Arrayed Waveguide Grating," Conference on Lasers and Electro-Optics 2003, 6-Jun-03.

D. E. Leaird and A. M. Weiner, "Femtosecond Direct Space-to-Time Pulse Shaping in an Integrated-Optic Configuration," accepted for publication in Optics Letters, anticipated publication date 1-Jul-04.

D. E. Leaird, A. M. Weiner, S. Kamei, M. Ishii, A. Sugita, and K. Okamoto, "Double-Passed Arrayed Waveguide Grating for 500 GHz Pulse Burst Generation," IEEE Photonics Technology Letters, Vol. 14, October 2002, pp. 1451–1453.

D. E. Leaird, A. M. Weiner, S. Kamei, M. Ishii, A. Sugita, and K. Okamoto, "Generation of Flat-Topped 500 GH1 Pulse Bursts Using Loss Engineered Arrayed Waveguide Gratings," IEEE Photonics Technology Letters, Vol. 14, June 2002, pp. 816–818.

D. E. Leaird, S. Shen, A. M. Weiner, A. Sugita, S. Kamei, M. Ishii, and K. Okamoto, "High Repetition Rate Femtosecond WDM Pulse Generation using Direct Space-to-Time Pulse Shapers and Arrayed Waveguide Gratings," Optical & Quantum. Electronics, Vol. 33, July 2001, pp. 811–826.

D. E. Leaird, S. Shen, A. M. Weiner, A. Sugita, S. Kamei, M. Ishii, and K. Okamoto, "High Repetition Rate Flat-Topped Pulse Trains from an Arrayed Waveguide Grating," in OSA *Trends in Optics and Photonics (TOPS) Vol 56, Conference on Lasers and Electro-Optics (CLEO) 2001*, Technical Digest (Optical Society of America, Washington, D.C., 2001), pp. 187–188.

D. E. Leaird, S. Shen, A. M. Weiner, A. Sugita, S. Kamei, M. Ishii, and K. Okamoto, "1 THz Repetition Rate Multichannel Pulse Train Source using an Arrayed Waveguide Grating," in OSA *Trends in Optics and Photonics (TOPS) Vol. 54, Optical Fiber Communication Conference*, Technical Digest (Optical Society of America, Washington, D.C., 2001), pp. WP1-1–WP1-3.

D. E. Leaird, A. M. Weiner, S. Shen, A. Sugita, S. Kamei, M. Ishii, and K. Okamoto, "Generation of High Repetition Rate W DM Pulse Trains from an Arrayed-Waveguide Grating," IEEE Photonics Technology Letters, Vol. 13, March 2001, pp. 221–223.

D. E. Leaird, and A. M. Weiner, "Femtosecond direct space-to-time pulse shaping," IEEE Journal of Quantum Electronics, Vol. 37, April 2001, pp. 494–504.

D. E. Leaird, S. Shen, A. M. Weiner, A. Sugita, H. Yamada, S. Karnei, M. Ishii, and K. Okamoto, "Direct space-to-time pulse shaper/arrayed waveguide grating analogy for high repetition rate WDM pulse train generation," in *Ultrafast Optics and Optoelectronics*, OSA Technical Digest (Optical Society of America, Washington D.C., 2001), pp. 6–8.

D. E. Leaird, S. Shen, A. M. Weiner, A. Sugita, S. Kamei, M. Ishii, and K. Okamoto, "1 THz Repetition Rate WDM Pulse Train Generation from an Arrayed-Waveguide Grating," in *Conference on Lasers and Electro-Optics Postdeadline Papers*, CPD18 (2000).

K. Okamoto, "Recent progress of integrated optics planar lightwave circuits," Opt. and Quant. Elec. Vol. 31, 107–129 (1999).

K. Okamoto, and A. Sugita, "Flat spectral response arrayed-waveguide grating multiplexer with parabolic waveguide horns," Elect. Lett., Vol. 32, 1661–1662 (1996).

K. Okamoto, "Arrayed-Waveguide Grating Multiplexer with Flat Spectral Response," Opt. Lett., Vol. 20, 43–45 (1995).

I. Y. Khrushchev, J. D. Bainbridge, J. E. A. Whiteaway, I. H. White, and R. V. Petty, "Multiwavelength pulse source for OTDM/WDM applications based on arrayed waveguide grating," IEEE Photon. Tech. Lett., Vol. 11, 1659–1661 (1999).

R. Adar, C. H. Henry, C. Dragone, R. C. Kistler, M. A. Milbrodt, "Broad-band array multiplexers made with silica wave-guides on silicon," J. Lightwave Tech., Vol. 11, 212–219, (1993).

All references cited herein are hereby incorporated by reference. U.S. Pat. No. 6,577,782 provides bulk optic options that may be employed with the present invention.

An advantage of the present backward DSTAWG concept, as compared to standard AWG structures, is that the present DSTAWG configuration provides direct optical access to the individual guides in the waveguide array. Through this direct access, one can control the light intensity in each guide and therefore control the output pulse intensities with the one-guide, one-pulse effect. It is also interesting to note that all waveguides in the waveguide array of the present DSTAWG are not required to be in-phase with a totally identical delay increment from one guide to the next guide as is the case for standard AWG structures. Although keeping the guides in-phase will produce better spectral characteristics, this is not required to obtain the desired temporal intensity profile. Phase tolerances on waveguide fabrication of the present DSTAWG are thus relaxed compared to standard AWG structures. This relation further applies to output pulse trains where the 'bits'-are not evenly spaced.

Additionally, while the present invention has been described as amplitude modulated as by a reflection mode amplitude modulator, the present invention may also utilize a reflection mode phase modulator to produce an output where the individual pulses are phase modulated as opposed to amplitude modulated. Also, it is possible to use both phase and amplitude modulation. This supports novel data modulation formats that may become important for future high-speed optical data transmission.

While the invention has been illustrated and described in detail in the drawings and foregoing description, the same is to be considered as illustrative and not restrictive in character, it being understood that only preferred embodiments has been shown and described and that all changes and modifications that come within the spirit of the invention are desired to be protected.

What is claimed is:

1. An optical transmitter comprising:
    a direct space-to-time pulse shaper comprising an integrated optic waveguide array defining a first end having a slab waveguide with a plurality of ports and an opposing end; and
    a mask positioned at said opposing end of said waveguide array;
    wherein at least one of the plurality of ports functions as an input for receiving a pulsed laser input source and an output for providing an optical pulse train according to said mask.

2. The optical transmitter of claim 1, wherein said mask comprises an optoelectronic modulator array.

3. The optical transmitter of claim 1, wherein said mask comprises a reflection mode modulator array.

4. The optical transmitter of claim 1, wherein said mask comprises a reflection mode combined amplitude and phase modulator array.

5. The optical transmitter of claim 1, wherein said mask comprises a reflection mode phase modulator array.

6. The optical transmitter of claim 5, wherein said reflection mode phase modulator array is operable to produce an output wherein individual pulses from each port are phase modulated.

7. The optical transmitter of claim 1, wherein said mask comprises a reflection mode amplitude modulator array.

8. The optical transmitter of claim 1, wherein said mask comprises a fixed reflector mask.

9. The optical transmitter of claim 1, wherein said mask comprises a programmable mask.

10. The optical transmitter of claim 1, wherein said ports comprise fiber ports.

11. The optical transmitter of claim 1, wherein said mask patterns said optical pulse train as a coded word.

12. A method for generating an optical transmission comprising the steps of:
    providing a direct space-to-time pulse shaper comprising an integrated optic waveguide array defining a first end having a slab waveguide with a plurality of ports and an opposing end, and a mask positioned at said opposing end of said waveguide array, each one of the plurality of ports functioning as an input for receiving a pulsed laser input source and an output for providing an optical pulse train according to said mask; and
    providing a short pulse laser source as input to at least one of said plurality of ports.

13. A method for generating an optical transmission comprising the steps of:
    spectrally dispersing a pulsed light beam via an integrated optic spectral dispersing element comprising a waveguide array, the pulsed light beam entering a port of a plurality of ports disposed at one end of the waveguide array;
    imposing a spatial pattern on the spectrally dispersed pulsed light beam; and
    reflecting the spatially patterned spectrally dispersed pulsed light beam back through the waveguide array from an opposing end of the waveguide array; and
    outputting the reflected spatially patterned spectrally dispersed pulsed light beam through the plurality of ports.

14. The method of claim 13, wherein the step of imposing a spatial pattern on the spectrally dispersed pulse light beam includes providing a mask at the opposing end of the waveguide array.

15. The method of claim 13, wherein the step of imposing a spatial pattern on the spectrally dispersed pulse light beam includes providing an optoelectronic modulator array at the opposing end of the waveguide array.

16. The method of claim 13, wherein the step of imposing a spatial pattern on the spectrally dispersed pulse light beam includes a reflection mode modulator array.

17. The method of claim 13, wherein the step of imposing a spatial pattern on the spectrally dispersed pulse light beam includes a fixed reflector mask.

18. The method of claim 13, wherein the step of imposing a spatial pattern on the spectrally dispersed pulse light beam includes a programmable mask.

19. A direct space-to-time integrated-optic arrayed waveguide grating comprising:
   a plurality of fibers defining combined input/outputs each one of which is adapted to receive a short pulse laser input;
   a slab waveguide collecting said plurality of combined input/outputs;
   a plurality of waveguides; and
   a spatial mask positioned at a reflection point of the plurality of waveguides and operable to selectively reflect light beam pulses back through said waveguides according to the spatial mask and out one of said combined input/outputs.

20. The direct space-to-time integrated-optic arrayed waveguide grating of claim 19, wherein said spatial mask comprises an optoelectronic modulator array.

21. The direct space-to-time integrated-optic arrayed waveguide grating of claim 19, wherein said spatial mask comprises a reflection mode modulator array.

22. The direct space-to-time integrated-optic arrayed waveguide grating of claim 21, wherein said reflection mode modulator array comprises at least one of a reflection mode phase modulator array and a reflection mode amplitude modulator array.

23. The direct space-to-time integrated-optic arrayed waveguide grating of claim 19, wherein said spatial mask comprises a fixed reflector mask.

24. The direct space-to-time integrated-optic arrayed waveguide grating of claim 19, wherein said spatial mask comprises a programmable mask.

25. A device for converting a parallel electrical word to a serial optical word comprising:
   a source pulse laser;
   a direct space-to-time pulse shaper comprising an integrated optic waveguide array defining a first end having a slab waveguide with a plurality of ports each one of which is adapted to receive a laser pulse from said source pulse laser, and an opposing end; and
   an optoelectronic modulator array positioned at said opposing end of the integrated optic waveguide array and adapted to spatially impress a parallel electrical word onto said integrated optic waveguide array;
   each one of the plurality of ports also functioning as an output for outputting the spatially impressed parallel electrical word as a serial optic word as reflected from said optoelectronic modulator array.

26. A method for converting a parallel electrical word into a serial optical word comprising the steps of:
   providing a source pulse laser,
   providing a direct space-to-time pulse shaper comprising an integrated optic waveguide array defining a first end having a slab waveguide with a plurality of ports each one of which is adapted to receive a laser pulse from said source pulse laser, and an opposing end; and
   providing an optoelectronic modulator array positioned at said opposing end of the integrated optic waveguide array and adapted to spatially impress a parallel electrical word onto said integrated optic waveguide array;
   wherein each one of the plurality of ports also functioning as an output for outputting the spatially impressed parallel electrical word as a serial optic word as reflected from said optoelectronic modulator array.

* * * * *